(12) United States Patent
Lin et al.

(10) Patent No.: US 7,886,341 B2
(45) Date of Patent: Feb. 8, 2011

(54) EXTERNAL AUTHENTICATION AGAINST A THIRD-PARTY DIRECTORY

(75) Inventors: Cheng-Fang Lin, Palo Alto, CA (US); Hari V N Sastry, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1053 days.

(21) Appl. No.: 10/866,231

(22) Filed: Jun. 10, 2004

(65) Prior Publication Data

US 2005/0278384 A1 Dec. 15, 2005

(51) Int. Cl.
*G06G 7/04* (2006.01)
*G06F 15/16* (2006.01)
*G06F 17/30* (2006.01)
*H04L 29/06* (2006.01)

(52) U.S. Cl. ............................................. 726/4; 726/6
(58) Field of Classification Search ................. 707/200; 726/4

See application file for complete search history.

(56) References Cited

U.S. PATENT DOCUMENTS

| | | | |
|---|---|---|---|
| 6,219,790 B1 * | 4/2001 | Lloyd et al. | 726/14 |
| 6,460,141 B1 * | 10/2002 | Olden | 726/4 |
| 6,799,177 B1 * | 9/2004 | Fai et al. | 707/9 |
| 2001/0025299 A1 * | 9/2001 | Chang et al. | 709/204 |
| 2002/0032769 A1 * | 3/2002 | Barkai et al. | 709/224 |
| 2002/0124082 A1 * | 9/2002 | San Andres et al. | 709/225 |
| 2003/0088656 A1 * | 5/2003 | Wahl et al. | 709/223 |
| 2005/0097441 A1 * | 5/2005 | Herbach et al. | 715/501.1 |

FOREIGN PATENT DOCUMENTS

| | | |
|---|---|---|
| JP | 94-6 | 6/1992 |
| JP | 5 40690 | 2/1993 |
| JP | 05040690 | 2/1993 |
| JP | 100-2 | 6/1993 |
| JP | 101-16 | 8/1993 |

(Continued)

OTHER PUBLICATIONS

Kourosh Gharachorloo, "Memory Consistency Models for Shared-Memory Multiprocessors", a dissertation, Dec. 1995, pp. 1-372.

(Continued)

*Primary Examiner*—Benjamin E Lanier
*Assistant Examiner*—Cordelia Zecher
(74) *Attorney, Agent, or Firm*—Park, Vaughan, Fleming & Dowler LLP

(57) ABSTRACT

A system and method for authenticating users against an external directory service. A client device issues an LDAP (Lightweight Directory Access Protocol) request (e.g., a login request) to a local or native directory server (e.g., an Oracle Internet Directory server) configured to authenticate users for access to a resource (e.g., an Oracle database, an Oracle application server). The native directory server does not maintain or synchronize user passwords, and forwards the request (or details of the request) to a plug-in residing in the resource. The plug-in forwards or issues the request to an external or third-party directory server or service, which attempts to authenticate the user and returns a result indicating success or failure. The plug-in returns the result to the local server, which responds to the client.

23 Claims, 2 Drawing Sheets

FOREIGN PATENT DOCUMENTS

| | | |
|---|---|---|
| JP | 107-19 | 7/1994 |
| JP | 109-7 | 12/1994 |

OTHER PUBLICATIONS

Fraser, et al., "An Overview of Asura's Network with Simulation Resluts", Aug. 12, 1998, pp. 133-140.
Agarwal, et al., "Sparcle: An Evolutionary Processor Design for Large-Scale Multiprocessors", Mar. 12, 1993, pp. 1-23.
Saito, et al., "Event Correspondent Cache Coherence Control Scheme Application Example and Basic Performance Thereof", Jan. 22, 1993, pp. 1-18.
Archibald, J., "High Performance Cache Coherence Protocols for Shared-Bus Multiprocessors", Jun. 11, 1986, pp. 1-20.
Agarwal et al., "The MIT Alewife Machine: Architecture and Performance", appeared in ISCA, 1995, pp. 1-12.
Heinlein et al., "Integrating Multiple Communication Paradigms in High Performance Multiprocessors", Technical Report CSL-TR-94-604, Feb. 10, 1994, pp. 1-29.
Joe et al., "An Analytical Model of the Asura System", Computer Architecture 99-17, Mar. 12, 1993, pp. 1-15.
Joe et al., "Hierarchical Properties and Evaluation of the "Asura" Distributed Shared Memory Multiprocessor System", Computer Architecture 95-1, Aug. 19, 1992, pp. 1-12.
Mori et al., "Overview of the ASURA: A Distributed Shared Memory Multiprocessor", Computer Architecture 94-6, Jun. 12, 1992, pp. 1-12.
Dr. Andre van Tilborg, "Semi-Annual Technical Progress", Nov. 1989-Mar. 1990, R&T Project Code: 4331685, Office of Naval Research, code 1133, pp. 1-19.
Mori et al., "A Distributed Shared Memory Multiprocessor: ASURA—Memory and Cache Architectures", 1993, ACM 0-8186-4340-4/93/0011, pp. 740-749.
"Sequent's NUMA-Q Architecture", copyright 1997, Sequent Computer Systems, Inc., pp. 1-9.
"Sequent's NUMA-Q SMP Architecture, How it works and where it fits in high-performance computer architectures", copyright 1997, Sequent Computer Systems, Inc. pp. 1-18.
Saito et al., "Event Correspondent Cache Coherence Control Scheme and Application Thereof to Barrier Synchronization", Computer Architecture 95-2, Aug. 19, 1992, pp. 1-14.
Goshima et al., "High-Performance Cache System Supporting Communication Between Fine-Grain Processors", Computer Architecture 101-16, Aug. 20, 1993, pp. 1-17.
Goshima et al., "Virtual Queue: A Message Communication Mechanism for Massively Parallel Computers", Computer Architecture 107-19, Jul. 22, 1994, pp. 1-17.
Lenoski et al., "The Stanford Dash Multiprocessor", IEEE, Mar. 1992, pp. 63-79.
Mori et al., "Self-Cleanup Cache Evaluation", Computer Architecture 109-7, Dec. 13, 1994, pp. 1-15.
Mori et al., "Proposal for Self-Clean-Up Type Write-Back Cache", Computer Architecture 100-2, Jun. 11, 1993, pp. 1-13.
Erickson, C. B., Ph.D., "Design and evaluation of a hierarchical bus multiprocessor", Michigan State University, 1991, Dept. of Electrical Engineering, pp. 1-155.
Archibald, J.K., "The Cache Coherence Problem in Shared-Memory Multiprocesors", Technical Report Feb. 6, 1987, Dept. of Computer Science and Engineering, FR-35, University of Washington, pp. 1-215.
Lenoski, Daniel E., "The Design and Analysis of DASH: A Scalable Directory-Based Multiprocessor", a dissertation copyright 1991, pp. 1-173.
Simoni, Richard Thomas, Jr., Ph.D., "Cache coherence directories for scalable multiprocessors", a dissertation, Jul. 1992, pp. 1-145.
McMillan, Kenneth L., "Symbolic Model Checking: An approach to the state explosion problem", submitted to Carnegie Mellon University in partial fulfillment of the requirements for the degree of Dr. of Philosopy in Computer Science, 1992, pp. 11-212.
Laudon, James Pierce, Ph.D., "Architectural and Implementation Tradeoffs for Multiple-context Processors", Copyright @ 1994 by Laudon, James Pierce, a dissertation, pp. 1-186.
Heinrich et al., "The Performance Impact of Flexibility in the Stanford FLASH Multiprocessor", appeared in Proceedings of the $6^{th}$ International Conference on Architectural Support for Programming Languages and Operating Systems (ASPLOS-VI), San Jose, CA, Oct. 1994, pp. 1-12.
Heinlein et al., "Integration of Message Passing and Shared Memory in the Stanford FLASH Multiprocessor", proceedings of the sixth international conference on Architectural Support for Programming Languages and Operating Systems (ASPLOS), Oct. 1994, pp. 1-13.
Gustavson et al., "Overview of the Scalable Coherent Interface", IEEE STD 1596, 1993, pp. 488-490.
Hagersten et al., "DDM-A Cache-Only Memory Architecture", 1992 IEEE, pp. 44-54.
Baer et al., "Architectural Choices for Multilevel Cache Hierarchies", proceedings of the 1987 International Conference on Parallel Processing, Aug. 17-21, 1987, pp. 257-261.
Baer et al., "On the Inclusion Properties for Multi-Level Cache Hierarchies", IEEE 1988, pp. 73-80.
Brewer, Tony, "A Highly Scalable System Utilizing up to 128 PAA-RISC Processors", Convex Computer Corporation, Proceedings of the $40^{th}$ IEEE Computer Society International Conference (COMPCON'95), pp. 133-140.
Brewer et al., "The Evolution of the HP/Convex Exemplar", 1997 IEEE, pp. 81-86.
Chaiken et al., "LimitLESS Directories: A Scalable Cache Coherence Shceme", Appeared in ASPLOS-IV, Apr. 1991, pp. 1-11.
Archibald et al., "An Economical Solution to the Cache Coherence Problem", 1984 IEEE, pp. 355-362.
Archibald et al., "Cache Coherence Protocols: Evaluation Using a Multiprocessor Simulation Model", ACM Transactions on Computer Systems, vol. 4, Nov. 1986, pp. 273-298.
Archibald, "A Cache Coherence Approach for Large Multiprocessor Systems", proceedings of the International Conference on Supercomputing, 1988, pp. 337-345, copyright @1988, Association for Computing Machinery.
White Paper, "The Dolphin SCI Interconnect", Feb. 1996, Dolphin Interconnect Solutions, pp. 1-16.
Tomasevic et al., "The Cache Coherence Problem in Shared-Memory Multiprocessors: Hardware Solutions", IEEE Computer Society Press, The Institute of Electrical and Electronics Engineers, Inc., 1993, pp. 1-280.
Wilson, Andrew Wilkins, Jr., "Organization and Statistical Simulation of Hierarchical Multiprocessors", 1985, UMI Dissertation Services from ProQuest Company, pp. 1-168.
Daniel E. Lenoski, "Scalable Shared-Memory Multiprocessing", 1995 by Morgan Kaufmann Publishers, Inc.
Goodman et al., "The Wisconsin Multicube: A New Large-Scale Sache-Coherent Multiprocessor", proceedings of the $15^{th}$ International Symposium on Computer Architecture, 1988, pp. 291-300, Copyright @ 1988 by The Institute of Electrical and Electronics Engineers, Inc.
Wilson et al., "Shared Memory Multiprocessors: The Right Approach to Parallel Processing", 1989 IEEE, pp. 72-80.
Weber et al., "The Mercury Interconnect Architecture: A Cost-effective Infrastructure for High-performance Servers", ISCA 1997, @1997 ACM, pp. 98-107.
Tomasevic et al., "Hardware Approaches to Cache Coherence n Shared-Memory Multiprocessors, Part 1", IEEE Computer Society, Oct. 1994, pp. 52-59.
Tomasevic et al., "Hardware Approaches to Cache Coherence in Shared-Memory Multiprocessors, Part 2", IEEE MICRO, published by IEEE Computer Society, vol. 14, No. 6, pp. 60-66.
Lenoski et al., "The DASH Prototype: Implementation and Performance", 1992 ACM, pp. 92-103.
Lenoski et al., "The Directory-Based Cache Coherence Protocol for the DASH Multiprocessor", 1990 IEEE, pp. 148-159.

Lovett et al., "Sting: A CC-NUMA Computer System for the Commercial Marketplace", ISCA 1996, @ 1996 ACM, pp. 308-317.
McMillan et al., "Formal Verification of the Gigamax Cache Consistency Protocol", International Symposium on Shared Memory Multiprocessing, Tokyo, Japan, Apr. 1991, pp. 242-251.
Richard T. Simoni, Jr., "Cache Coherence Directories for Scalable Multiprocessors", Mar. 1995,pp. 1-145.

IEEE Standard for Scalable Coherent Interface (SCI), Microprocessor and Microcomputer Standards Subcommittee of the IEE Computer Society, IEEE-SA Standards Board, Mar. 19, 1992, pp. 1-243.
Oracle Corporation, Oracle Internet Directory, Nov. 2001, http://otn.oracle.com/products/oid/htdocs/oidwp9iAS2.pdf.

* cited by examiner

EXTERNAL AUTHENTICATION AGAINST A THIRD-PARTY DIRECTORY

BACKGROUND

This invention relates generally to the field of computer systems. More particularly, a system and method are provided for authenticating a user against an external third-party directory rather than a local directory.

Directory servers and services such as Oracle® Corporation's OID (Oracle Internet Directory) service store commonly used information regarding users, applications and machines (e.g., computing devices). A directory service allows these entities to be organized into namespaces to facilitate the central management of user information, among other purposes. Information stored in a directory service may thus include roles, credentials, privileges, certificates, preferences, etc.

A directory service such as OID service may be used to authenticate users when they attempt to connect to a server or service (e.g., web server, database, application server) that is coupled to the directory service or resides within the namespace of the directory service. Thus, to access a database within a particular namespace, a directory server associated with that database receives a user's connection and attempts to authenticate the user (e.g., by comparing a password proffered by the user to the user's password stored in the directory). For example, users connecting to an Oracle database are normally authenticated through an OID server, which may be directly coupled to an application server.

Many organizations have heterogeneous networks and computing environment, possibly including multiple directory servers or other servers capable of authenticating users (e.g., legacy systems) or containing repositories of user information.

Unfortunately, it is not generally possible for one directory server or service to authenticate a user against another (e.g., external or third-party) directory service. Instead, each directory server must store the necessary access control information to authenticate a user.

Therefore, to enjoy the benefit of centralized management of user information, while still being able to access the applications or services offered by the organization's various servers, the user information may be synchronized or replicated among the servers. By copying the user information to each server that receives and approves user connections, each server continues to perform its own local authentication for each connection.

However, by sharing user information among the servers, a user's password (or other information) must be updated throughout the environment every time it changes. This may cause a substantial amount of network traffic. And, some information may not be shared or synchronized (e.g., because the owners or holders of the information will not release it).

Also, there will necessarily be some delay before updated or synchronized information is effective throughout the organization. During this time, a user may be unable to access a particular server or service.

Yet further, storing users' information in multiple locations can cause problems. For example, if just one of the servers is compromised, all users' credential information is at risk. And, if a problem occurs in the servers' synchronization, a subset of them may end up with obsolete information.

SUMMARY

In one embodiment of the invention, a system and methods are provided for authenticating users against an external or third-party directory service. A client device issues an LDAP (Lightweight Directory Access Protocol) request to a local or native directory server (e.g., an Oracle Internet Directory server) configured to authenticate users for access to a resource (e.g., a database, an application server). For example, the request may comprise an ldapbind or ldapcompare request.

The native directory server does not maintain or synchronize user passwords and, instead of performing the corresponding operation (e.g., ldapbind or ldapcompare), it forwards the request (or details of the request) to a plug-in executing within a program space of the resource. The plug-in forwards or issues the request to an external or third-party directory server or service that stores the necessary user credential information. The external directory server attempts to authenticate the user, and returns a result indicating success or failure. The plug-in returns the result to the local server, which responds to the client.

DETAILED DESCRIPTION

Figure 1:
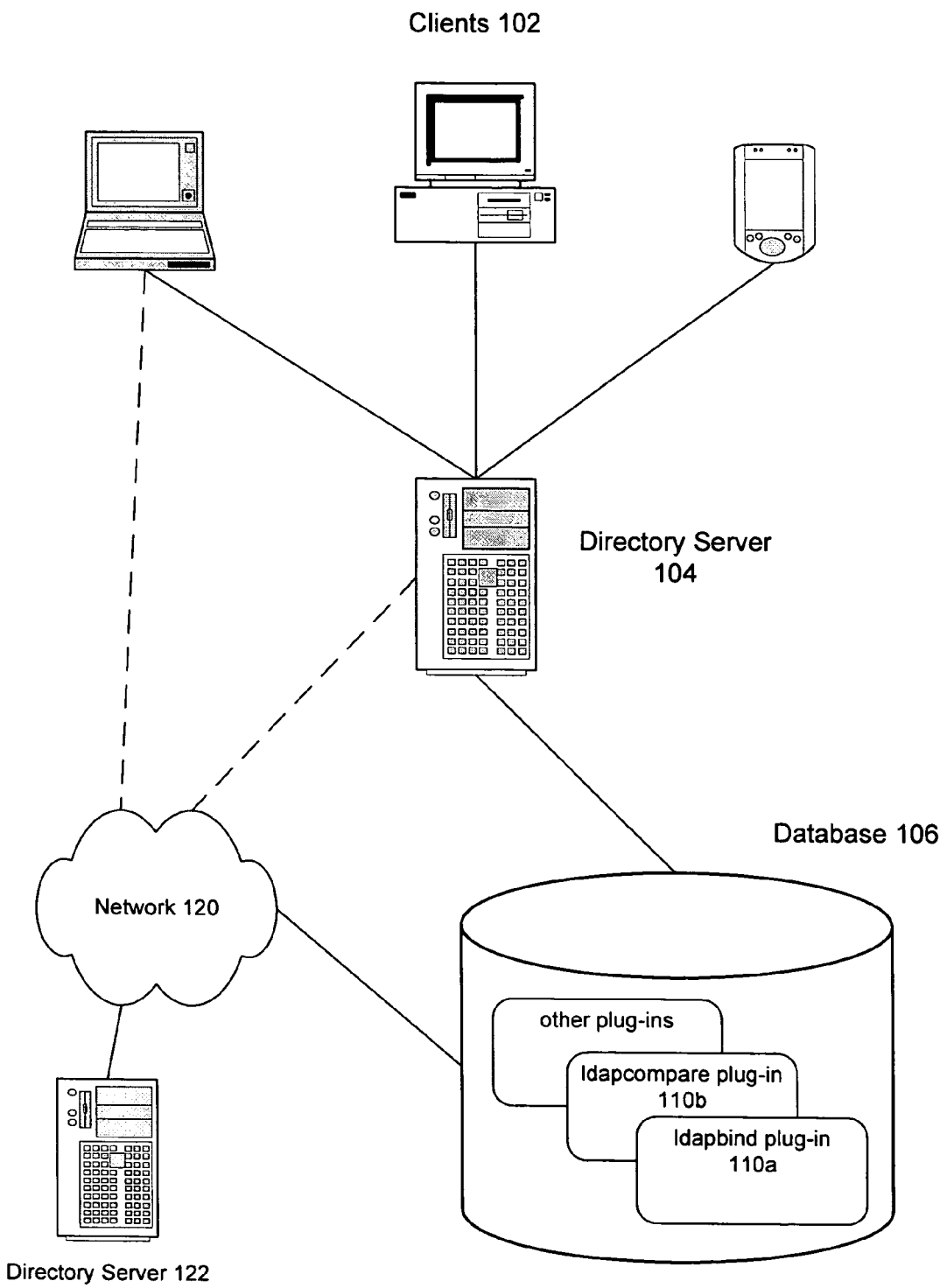
FIG. 1 depicts a computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable medium may include volatile (e.g., RAM) and/or non-volatile (e.g., ROM, disk) memory.

In one embodiment of the invention, a system and method are provided for authenticating a user against an external (e.g., third-party) directory service. In this embodiment, the user's login or connection request is received at a local directory server that approves or disapproves access to a database, application, web server or other entity. The local directory server has only minimal user footprint information, and does not store credential information (e.g., passwords) for authenticating the user, and therefore cannot perform authentication locally. The local directory server forwards (or restates) the request toward an external directory service. The external service authenticates the user and returns an authentication result (e.g., success or failure) toward the local server, which responds to the user.

In one implementation of this embodiment, the local server first passes the request to a plug-in module that performs the necessary operation for obtaining authentication. For example, if the login request comprises an ldapbind request, the plug-in comprises code for replacing the local directory server's version of the ldapbind operation. Illustratively, the plug-in may reside and execute within a program space of a database coupled to the local directory server.

In one particular embodiment of the invention, the local directory server is an OID (Oracle Internet Directory) server coupled to an Oracle database, and normally is configured to authenticate users seeking access to the database or an application server. However, information for authenticating a user is not stored on the OID server, perhaps because such information is centrally managed at one location (e.g., the external directory service) and is not synchronized with the OID server, possibly to avoid the various problems of synchronization and repercussions of incomplete synchronization.

In this embodiment, the OID server implements the LDAP (Lightweight Directory Access Protocol), and thus receives LDAP requests from users and clients (e.g., ldapbind, ldapcompare). These requests may be forwarded to the external directory service in their native LDAP protocol, or may be forwarded via SQL (Structured Query Language), PL/SQL (Procedural Language/Structured Query Language) or a customized API (Application Programming Interface).

Illustratively, login requests from client devices are received at the OID server and forwarded to the Oracle database, in which resides a set of OID Server plug-ins configured to replace the normal LDAP operations. The plug-ins operate in a program space of the database, and connect to the external directory service as needed to authenticate a user.

FIG. 1 depicts a computing environment in which an embodiment of the invention may be implemented. Other embodiments of the invention may be derived from the following description.

In FIG. 1, clients 102 include various devices for accessing database 106. Clients 102 may include desktop, laptop and portable computing devices, configured for use by various users. Directory server 104 may be an OID server, which can be configured to perform native authentication of users requesting access to database 106 and/or other portions of the Oracle technology stack or Oracle application stack. But, in this case, the directory server does not store necessary user credential information (e.g., passwords) for performing such authentication. However, directory server 104 may be able to handle other directory operations not requiring or involving the user credential information.

Database 106 may be an Oracle RDBMS (Relational Database Management System) by Oracle Corporation. The database includes any number of plug-ins (e.g., OID Server plug-ins) for augmenting or replacing operations (e.g., LDAP operations) normally performed by the directory server. For example, database 106 includes OID Server plug-in 110a for an ldapbind operation of LDAP, OID Server plug-in 110b for the ldapcompare operation, and may include others. The plug-ins may perform various LDAP operations (and/or operations of other protocols) and may be written in PL/SQL or some other suitable language.

The plug-in framework residing in the database may include plug-ins of different scope. Individual plug-ins may be pre-operative or post-operative, in which case they execute before or after the LDAP or other operation they augment, respectively. Or, a plug-in may be a replacement plug-in, in which case it is executed in place of the corresponding operation. The plug-ins may be installed as part of directory server 104, database 106 or some other network or application entity (e.g., an application server).

Database 106, and any or all of clients 102 and directory server 104 are coupled to network 120, which may comprise the Internet. External or remote directory server 122 maintains user credential information (e.g., passwords) for users desiring access to database 106 and/or other resources within the computing environment (e.g., the Oracle technology stack). External server 122 may comprise a SunOne directory server, a Microsoft Active directory server, or other directory server. The external directory server may be considered "external" in that it is outside the namespace of directory server 104.

Figure 2:
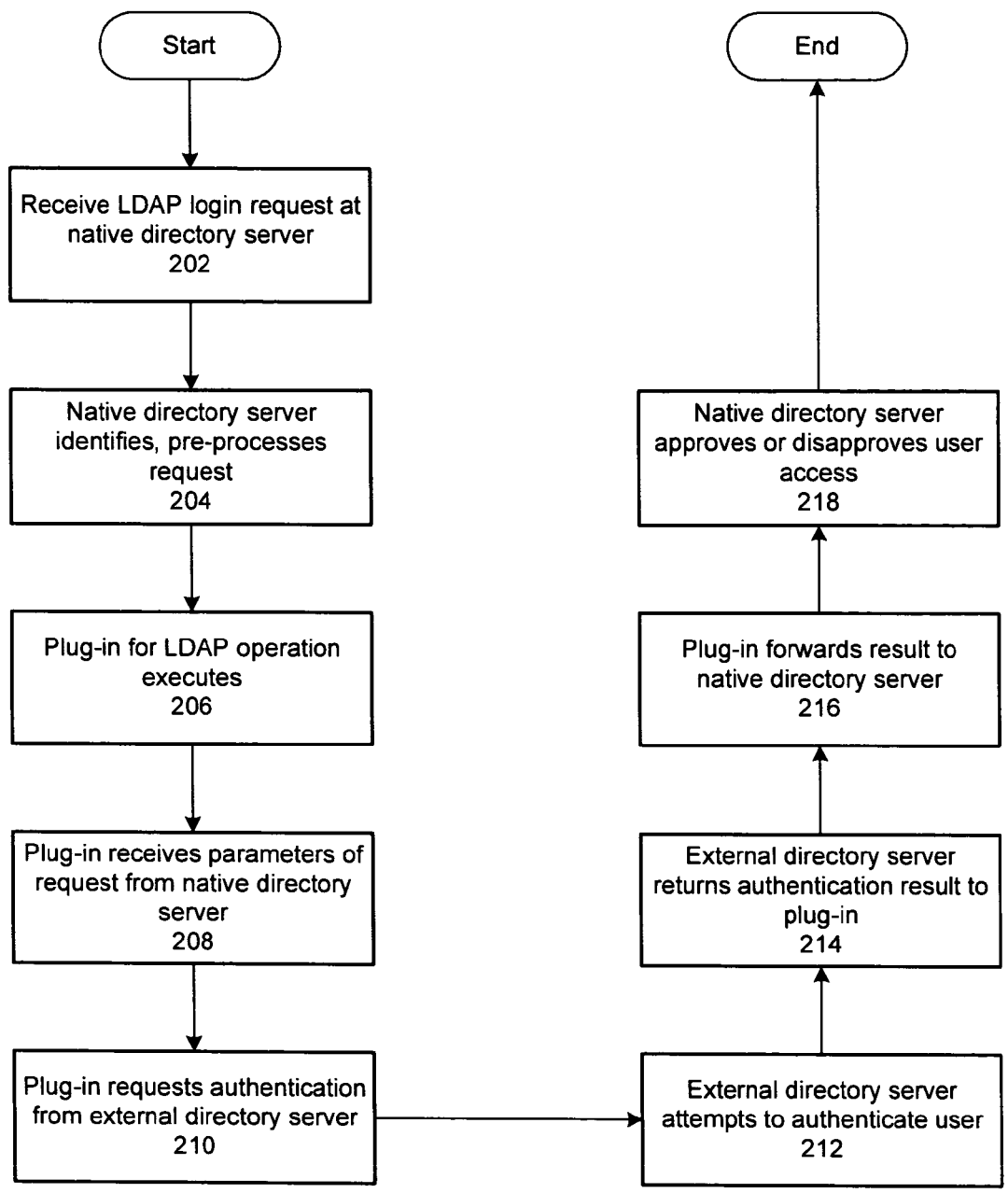
FIG. 2 is a flowchart illustrating one method of authenticating a user against an external directory service, in accordance with an embodiment of the invention.

FIG. 2 is a flowchart demonstrating one method of authenticating users against an external or third-party directory service, according to one embodiment of the invention. This embodiment is described as it may be implemented in the environment of FIG. 1, and other suitable embodiments may be derived from the following description.

In this embodiment, directory server 104 is a native or local directory server (e.g., an OID server) closely coupled to database 106. Plug-ins 110a, 110b are replacement plug-ins that execute in place of corresponding ldapbind and ldapcompare operations on server 104. The plug-ins operate transparently to users, so that the users cannot readily discern whether they are being authenticated locally at directory server 104, or remotely at server 122.

In operation 202 of the method of FIG. 2, a login request (e.g., an ldapbind or ldapcompare request), or other request that requires user authentication, is received at the native or local directory server (server 104). The login request may be conveyed via an LDAP C API, an LDAP PL/SQL API, JNDI (Java Naming and Directory Interface), or some other protocol or interface.

In operation 204, the native directory server may pre-preprocess the request to establish an LDAP connection, setup session information and extract information from the request and/or perform other tasks.

In operation 206, a plug-in corresponding to the request is executed. As described above, this plug-in may comprise an OID Server plug-in. In the illustrated embodiment of the invention, the plug-in executes within program space within database 106. In this embodiment of the invention, the request may be an LDAP request (e.g., ldapbind). The plug-in may therefore completely replace the normal LDAP operation that would be performed on the native directory server in response to the request.

In other embodiments, the plug-in may execute logic before and/or after the normal LDAP operation on the native server. For example, the plug-in may perform some pre-operation processing to ensure the proffered password is at least a minimum required size (and may report an authentication failure if not), satisfies some other required format or password policy, or that another parameter of the request is formatted appropriately.

In operation 208, the plug-in receives from the native directory server parameters of the user or client request, such as DN (Distinguished Name), password, and virtually any other attribute(s) of a directory entry associated with the user.

In operation 210, the plug-in forwards or redirects the request to the external (e.g., third-party) directory server 122, or generates and sends a new request in place of the original request. The request may include any necessary attributes (e.g., DN, password), and may be issued via a PL/SQL LDAP API (if the external directory is an LDAP compliant directory), PL/SQL or some other protocol or interface.

For example, if the external directory server is an RDBMS-based repository of access control information, the request may be forwarded via PL/SQL. Or, if the external directory server is a legacy or proprietary server, but a corresponding API is published, the request may be formatted as required by the legacy system's API.

Illustratively, neither the native directory server nor the plug-in identifies the external directory server to the client, thereby promoting transparent authentication. Thus, the client does not select, specify or even know of the involvement of the external directory server.

In operation 212, the external directory server receives the request and attempts to authenticate the user, based on attributes of the user's directory entry provided by the plug-in.

In operation 214, the external directory server returns a response to the authentication request to the plug-in, to indicate whether the authentication was successful or unsuccessful.

In operation 216, the plug-in forwards or reports the response to the native directory server 104. The plug-in may also perform any desired post-operation processing (e.g., to log the user's activity and/or authentication result).

In operation 218, the native directory server responds appropriately to the client that issued the request, based on whether the authentication was successful.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of external user authentication, comprising:
   receiving at a native directory server an authentication request comprising a directory operation under a standard Lightweight Directory Access Protocol (LDAP) protocol from a client for accessing a resource in a database coupled to the native directory server;
   in response to the client's credential information not being stored in the native directory server, forwarding the authentication request from the native directory server to a plug-in module maintained in a program space within the database;
   executing the plug-in module within the database to replace the directory operation with another directory operation under a protocol that is customized to an external third-party directory server that stores credential information of the client;
   redirecting the authentication request comprising the replaced directory operation to the external third-party directory server;
   receiving an authentication result from the external third-party directory server at the plug-in module; and
   reporting the authentication result to the native directory server, thereby making the authentication through the external third-party directory server transparent to the client.

2. The method of claim 1, further comprising:
   granting or denying access to a network resource based on the result.

3. The method of claim 1, further comprising:
   granting or denying access to the Oracle technology stack based on the result.

4. The method of claim 1, wherein said forwarding comprises forwarding one or more parameters of the request, including a password.

5. The method of claim 4, wherein said forwarding comprises forwarding the parameters from the plug-in module to the external third-party directory server.

6. The method of claim 1, wherein the native directory server is an Oracle Internet Directory (OID) server.

7. The method of claim 6, further comprising:
   maintaining the plug-in module within a program space of an Relational Database Management System (RDBMS).

8. The method of claim 1, wherein said executing comprises:
   executing the plug-in module in addition to an LDAP operation corresponding to the request.

9. A non-transitory computer readable medium storing instructions that, when executed by a computer, cause the computer to perform a method of external user authentication, comprising:
   receiving at a native directory server an authentication request comprising a directory operation under a standard Lightweight Directory Access Protocol (LDAP) protocol from a client for accessing a resource in a database coupled to the native directory server;
   in response to the client's credential information not being stored in the native directory server, forwarding the authentication request from the native directory server to plug-in module maintained in a program space within the database;
   executing the plug-in module within the database to replace the directory operation with another directory operation under a protocol that is customized to an external third-party directory server that stores credential information of the client;
   redirecting the authentication request to an external the external third-party directory server,
   receiving an authentication result from the external third-party directory server at the plug-in module; and
   reporting the authentication result to the native directory server, thereby making the authentication through the external third-party directory server transparent to the client.

10. An automated method of authenticating a user against an external third-party directory service, the method comprising:
    receiving at a native directory server an authentication request comprising a directory operation under a standard Lightweight Directory Access Protocol (LDAP) protocol from a client for accessing a resource coupled to the native directory server;
    in response to the client's credential information not being stored at the native directory server, forwarding the authentication request from the native directory server to a plug-in module maintained in a program space within the database;

executing the plug-in module within the database to replace the directory operation with another directory operation under a protocol that is customized to an external third-party directory server that stores credential information of the client;

redirecting the authentication request comprising the replaced directory operation to the external third-party directory server;

receiving at the plug-in module from the external third-party directory server an authentication result; and granting or denying the requested access based on the authentication result, thereby making the authentication through the external third-party directory server transparent to the client.

11. The method of claim 10, wherein executing the plug-in module to redirect the authentication request further comprises:

forwarding one or more parameters of the authentication request to the external third-party directory server, wherein the one or more parameters include a password; and requesting authentication from the external third-party directory server.

12. The method of claim 10, wherein executing the plug-in module to redirect the authentication request comprises:

forwarding the authentication request to a database comprising the plug-in module configured to process the authentication request; and from the plug-in module, requesting authentication by the external third-party directory server.

13. A network, comprising:

a native directory server configured to grant users access to a set of network resources, wherein the native directory server is capable of performing a normal directory service operation in response to a directory service request;

a third-party directory server configured to store credential information of the users; and a set of plug-in modules within a database corresponding to directory operations within the namespace of the native directory server, including a plug-in module corresponding to a request for a first type of directory operation that requires authentication of a user;

wherein the native directory server is configured to:
  receive a directory service request for the first type of directory operation under a standard Lightweight Directory Access Protocol (LDAP) protocol from a client;
  in response to the client's credential information not being stored at the native directory server, forward the directory service request to the plug-in module within the database; and wherein the plug-in module is configured to:
  replace the first type of directory operation with another directory operation under a protocol that is customized to the external third-party directory server;
  redirect the authentication request comprising the replaced directory operation to the external third-party directory server, and
  receive an authentication result from the external third-party directory server that stores the credential information of the client, and
  reporting the authentication result to the native directory server, thereby making the authentication through the third-party directory server transparent to the client.

14. The network of claim 13, further comprising:
a database coupled to the native directory server, wherein the database is one of the network resources.

15. The network of claim 14, wherein the plug-in module resides in a program space of the database.

16. The network of claim 13, wherein the plug-in module is executed in addition to a directory operation on the native directory server.

17. The network of claim 13, wherein:
the native directory server comprises an Oracle Internet Directory (OID) server;
the directory operations are Lightweight Directory Access Protocol (LDAP) operations; and
the set of network resources comprises an RDBMS (Relational Database Management System).

18. The network of claim 13, wherein the plug-in module solicits the authentication via Procedural Language/Structured Query Language (PL/SQL).

19. The network of claim 13, wherein the plug-in module solicits the authentication via Structured Query Language (SQL).

20. The network of claim 13, wherein the plug-in module solicits the authentication via an LDAP request.

21. A system for externally authenticating a user, comprising:

a native directory means for performing directory service operations;

a third-party directory means for performing directory service operations, wherein said third-party directory means contains the user credential information;

means for, in response to the client's credential information not being stored at the native directory server, forwarding an authentication request comprising a directory operation under a standard Lightweight Directory Access Protocol (LDAP) protocol received at the native directory means to the third-party directory means, wherein the means for forwarding is a plug-in module within a database outside of the native directory means, means for executing the plug-in module within the database to replace the directory operation with another directory operation under a protocol that is customized to the third-party directory means;

means for directing the authentication request comprising the replaced directory operation to the external third-party directory means; and means for reporting the authentication result from the third-party directory means to the native directory means, thereby making the authentication through the external third-party directory server transparent to the user.

22. The system of claim 21, further comprising:
a database coupled to the native directory service means;
wherein the authentication request comprises a request for authentication to facilitate access to the database.

23. The system of claim 22, wherein said means for forwarding and said means for returning operate within a program space of the database.

* * * * *

UNITED STATES PATENT AND TRADEMARK OFFICE
CERTIFICATE OF CORRECTION

PATENT NO. : 7,886,341 B2
APPLICATION NO. : 10/866231
DATED : February 8, 2011
INVENTOR(S) : Lin et al.

Page 1 of 1

It is certified that error appears in the above-identified patent and that said Letters Patent is hereby corrected as shown below:

On Title page 2, in column 1, under "Other Publications", line 9, delete "Resluts" and Insert -- Results --, therefor.

On Title page 2, in column 1, under "Other Publications", line 60, delete "Multiprocesors" and Insert -- Multiprocessors --, therefor.

On Title page 2, in column 2, under "Other Publications", line 29, Delete "shceme" and Insert -- scheme --, therefor.

In column 6, line 50, in Claim 9, after "request to" delete "an external".

In column 6, line 51, in Claim 9, delete "server," and Insert -- server; --, therefor.

Signed and Sealed this
Twenty-seventh Day of September, 2011

David J. Kappos
*Director of the United States Patent and Trademark Office*